United States Patent [19]
Yeh

[11] Patent Number: 5,909,820
[45] Date of Patent: Jun. 8, 1999

[54] BEVERAGE CONTAINER WITH GROOVED LID

[76] Inventor: Frank Yeh, 1019 N. Mayflower St., Anaheim, Calif. 92801

[21] Appl. No.: 08/982,833

[22] Filed: Dec. 2, 1997

[51] Int. Cl.[6] .................................................. A47G 19/22
[52] U.S. Cl. .......................... 220/711; 220/713; 215/356; 215/387; 222/519; 222/552
[58] Field of Search ..................... 215/356, 357, 215/386, 387, 307, 309, 310, 311, 314, 296, 43–45; 220/288, 290, 703, 711, 714, 715, 716, 718, 719, 713; 222/549, 552, 554, 563, 519, 520, 507, 108–111, 568

[56] References Cited

U.S. PATENT DOCUMENTS

| | | | |
|---|---|---|---|
| 845,400 | 2/1907 | Ferguson | 222/563 X |
| 992,928 | 5/1911 | Walcott | 215/356 |
| 2,015,343 | 9/1935 | Jackson | 222/519 X |
| 2,167,476 | 7/1939 | Diefenbach | 222/549 X |
| 2,969,887 | 1/1961 | Darmstadt et al. | 222/563 |
| 3,141,586 | 7/1964 | Wettrek | 222/522 X |
| 3,776,433 | 12/1973 | De Treitas | 222/519 |
| 3,809,275 | 5/1974 | Ek | 222/519 X |
| 5,060,827 | 10/1991 | Segati | 222/552 X |

FOREIGN PATENT DOCUMENTS

| | | | |
|---|---|---|---|
| 539694 | 7/1955 | Belgium | 215/356 |
| 629447 | 11/1927 | France | 215/356 |
| 3324741 | 1/1985 | Germany | 215/356 |
| 21144 | 2/1911 | Norway | 215/356 |
| 438207 | 11/1935 | United Kingdom | 215/307 |

Primary Examiner—Stephen K. Cronin
Assistant Examiner—Nathan Newhouse
Attorney, Agent, or Firm—Raymond Sun

[57] ABSTRACT

An assembly is provided having a beverage container and a lid. The beverage container includes a body defining a hollow interior for holding liquids, and a curved annular wall attached to the top rim of the body, the curved annular wall having an upper end that defines a drinking mouth. The inner diameter of the curved annular wall is greater at the upper end than at a central portion thereof. The lid includes a core having an annular outer wall which has a generally curved configuration, and at least one groove provided along the annular outer wall and extending from the top end of the core to the bottom end of the core. The lid further includes a top plate attached to the top end of the core and completely covering the groove, with the top plate having an outer circumferential edge.

13 Claims, 3 Drawing Sheets

BEVERAGE CONTAINER WITH GROOVED LID

BACKGROUND OF THE INVENTION

1. Field Of The Invention

The present invention relates to beverage containers, and in particular, to a beverage container having a tightly sealed lid that allows the beverage container to hold hot liquids and to effectively retain the heat in such liquids, while allowing a user to drink from the beverage container without removing the lid.

2. Description Of The Related Art

A "thermos", or thermoflask, is a beverage container that is commonly used to store hot beverages. The thermos is provided with an insulating wall and a tightly-sealed lid that together are effective in keeping the beverage warm. The thermos is popular because hot beverages such as hot water, hot soup, or hot coffee can be stored in the thermos for extended periods of time without the hot beverage losing much of its warmth or heat. As a result, hot beverages can be effectively carried from the home to different locations, such as to a picnic, to the office, or to a hospital, for example.

These thermos are typically provided with a tightly sealed lid. The lid typically includes a plurality of threads provided on its outer circumferential surface which are adapted to engage corresponding threads provided along the inner circumference of the mouth of the thermos. To drink, or to pour, the beverage contained in the thermos, the user must either completely remove the lid from the mouth of the thermos, or loosen the threaded engagement between the mouth and the lid by unscrewing or unthreading the lid by a couple of revolutions.

Unfortunately, complete removal of the lid results in certain drawbacks. First, complete removal of the lid results in inconvenience to the user, who must either find a clean surface on which to rest the top of the lid, or must use one hand to hold the lid, while the user is either drinking from the thermos or pouring the beverage from the thermos. This is especially inconvenient when the user is attempting to pour the beverage into a cup, glass or bowl, since the user will usually need to use one hand to grip the thermos and the other hand to grip the cup, glass or bowl.

Second, if the user desires to rest a completely-removed lid on a surface, the user must be careful to find a clean surface. In addition, the user must be careful to rest the top, and not the bottom, of the lid on the surface. Otherwise, the bottom of the lid may contact dirt or other undesirable particles, which may contaminate the remaining beverage in the thermos when the lid is subsequently secured to the mouth of the thermos. In this regard, the bottom of the lid is typically very hot from its contact and exposure to the hot beverage contained inside the thermos, and this will make it more difficult for the user to carefully handle the completely-removed lid.

Third, spillage can be a problem when the user attempts to pour hot beverage through the completely-opened mouth. Spillage of hot liquids can cause physical harm to or scald the user.

Fourth, by completely removing the lid, the hot beverage contained inside the thermos will be exposed to the outside environment, often causing heat to dissipate quickly, thereby causing the hot beverage to cool.

Instead of completely removing the lid, the user can also loosen the threaded engagement between the mouth and the lid. However, this alternative also suffers from certain drawbacks. By loosening the threaded engagement between the mouth and the lid, the position of the lid will be raised with respect to the mouth, so that a small annular gap will be provided between the bottom of the lid and the inner circumference of the mouth of the thermos. The beverage contained inside the thermos can then flow through the annular gap. Unfortunately, the annular nature of the gap means that the outflow of the beverage is not controlled, so that the outflowing beverage may be difficult to pour or drink. To address this problem, many thermos have provided an annular ledge at the top of the mouth that leads to a spout, so as to guide the outflowing beverage towards the spout.

One drawback with a spouted thermos is that it is difficult to drink from a spout. Therefore, the beverage inside these spouted thermos must first be poured into a cup, mug, glass, bowl or other drinking container before the user can drink the beverage. This adds significant inconvenience to the user, since the user must now provide a separate drinking container in addition to the thermos.

Thus, there remains a need for a beverage container that can effectively retain hot beverages in a manner which reduces the amount of heat that is dissipated, that provides a tight seal to prevent fluid or heat loss, and that provides controlled fluid flow which allows the user to drink from the beverage container while minimizing spillage of the beverage.

SUMMARY OF THE INVENTION

The objects of the present invention may be achieved by providing an assembly having a beverage container and a lid. The beverage container includes a body defining a hollow interior for holding liquids, and a curved annular wall attached to the top rim of the body, the curved annular wall having an upper end that defines a drinking mouth. The inner diameter of the curved annular wall is greater at the upper end than at a central portion thereof. The lid includes a core having an annular outer wall which has a generally curved configuration, and at least one groove provided along the annular outer wall and extending from the top end of the core to the bottom end of the core. The lid further includes a top plate attached to the top end of the core and completely covering the groove, with the top plate having an outer circumferential edge.

The lid can be partially engaged with the curved annular wall of the beverage container by engaging a portion of the core and the curved annular wall at a position which defines an annular gap between the outer circumferential edge of the top plate and the curved annular wall. At this partial engagement position, a fluid passageway is defined which includes the groove and the annular gap. The lid can also be completely engaged with the curved annular wall of the beverage container at a position in which the top plate completely covers the mouth of the curved annular wall. The lid is positioned at a higher vertical level at the partial engagement position than at the complete engagement position. The lid can be moved from the complete engagement position to the partial engagement position by raising the vertical position of the lid with respect to the vertical position of the curved annular wall.

According to one embodiment of the present invention, the size and configuration of an upper portion of the annular outer wall corresponds to the size and configuration of a portion of the curved annular wall to facilitate snug engagement therewith.

According to another embodiment of the present invention, the curved annular wall of the beverage container has an inner surface that is provided with a plurality of internal threads, and the annular outer wall of the lid is provided with a plurality of external threads for engaging the internal threads of the curved annular wall.

The lid according to the present invention may further include an annular flange along the outer circumferential edge of the top plate which covers the groove. The lid may further include a top surface, and at least two finger holes provided in spaced-apart manner on the top surface. Alternatively, according to another embodiment of the present invention, a gripping bar may be provided on the top surface.

According to yet a further embodiment of the present invention, the lid may further include a second groove provided along the annular outer wall and extending from the top end to the bottom end, and positioned substantially opposite from the one groove.

Thus, the assembly according to the present invention provides controlled flow of the beverage through the lid in a manner which minimizes spillage. In addition, the top plate completely covers the mouth of the curved annular wall of the beverage container to provide a fluid-tight seal, so that fluid flow is interrupted when the lid is completely engaged with the curved annular wall of the beverage container. This seal minimizes heat and fluid loss from the beverage contained therein. The lid does not need to be removed during drinking, and the user can drink directly from the beverage container by positioning the lid in partial engagement with the curved annular wall.

DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

The present invention provides an assembly that includes a beverage container, and a lid that is engaged with the mouth of the beverage container. The lid has a core which is provided with at least one groove along its circumference and extending from a top plate to the bottom of the lid. The mouth of the beverage container is provided with an annular curved wall having a configuration that combines with the groove to provide a controlled fluid passageway through the lid when the lid is not completely (i.e., partially) engaged with the mouth of the beverage container. When the lid is completely engaged with the mouth of the beverage container, the top plate of the lid acts as a seal which completely covers the groove and the fluid passageway to provide a fluid-tight seal.

Figure 1:
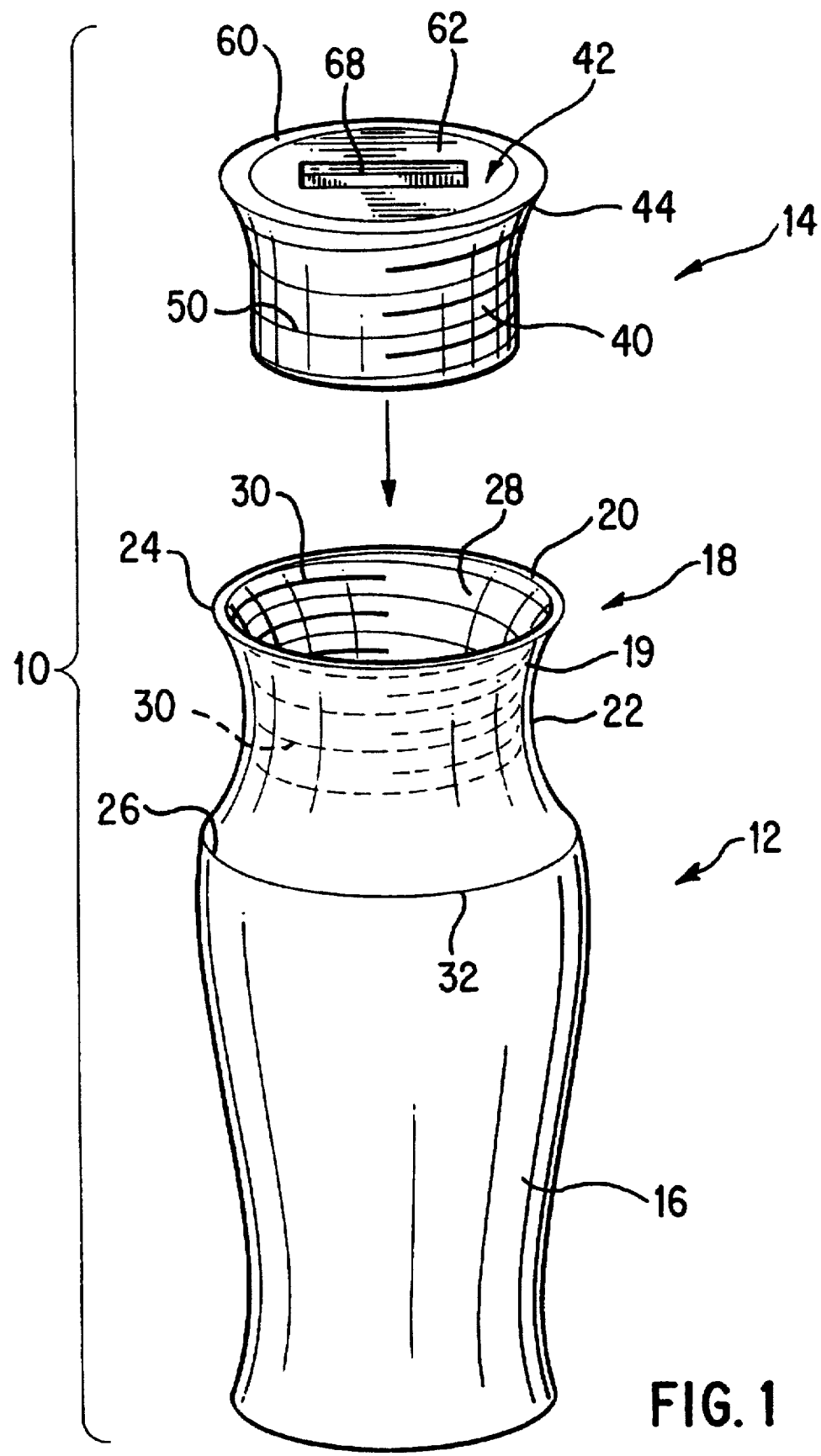
FIG. 1 is an exploded perspective view of a beverage container and lid assembly according to one embodiment of the present invention.

FIG. 1 illustrates an assembly 10 according to the present invention. The assembly 10 includes a beverage container 12 and a lid 14. The beverage container 12 has a body 16 which can be provided in any desired size and configuration, even though the body 16 is illustrated in FIG. 1 as having a generally cylindrical configuration. The body 16 can be made from any suitable material, although a material which provides effective insulation to the beverage stored therein can be effective in keeping the beverage warm. Examples of materials that can be used for the body 16 include without limitation stainless steel, plastics, glass, ceramics, porcelain, stoneware, earthenware and pottery.

The body 16 defines an interior chamber which is adapted to contain a beverage, and has an upper section 18 that defines a mouth 20. The upper section 18 has a generally annular concave configuration defining an annular curved wall 19 that has a smaller diameter at its central portion 22 than at its upper end 24 to define a flared configuration for the mouth 20. The flared configuration is best illustrated in FIGS. 4 and 5. The inner surface 28 of the curved wall 19 is provided with a plurality of internal threads 30 that are formed integrally or in one piece with the inner wall 28. The upper section 18 can be provided in one piece and in the same material as the body 16, so that it is part of the body 16. Alternatively, the upper section 18 can also be provided as a separate piece and its lower end 26 attached to the top rim 32 of the body 16 by gluing, welding, snap-fit engagement, or any other conventional connection mechanism. When provided as a separate piece, the upper section 18 can be provided in a different material that may also provide excellent insulation to prevent heat loss. The materials for the upper section 18 can include, but are not limited to, the materials identified above.

Figure 3:
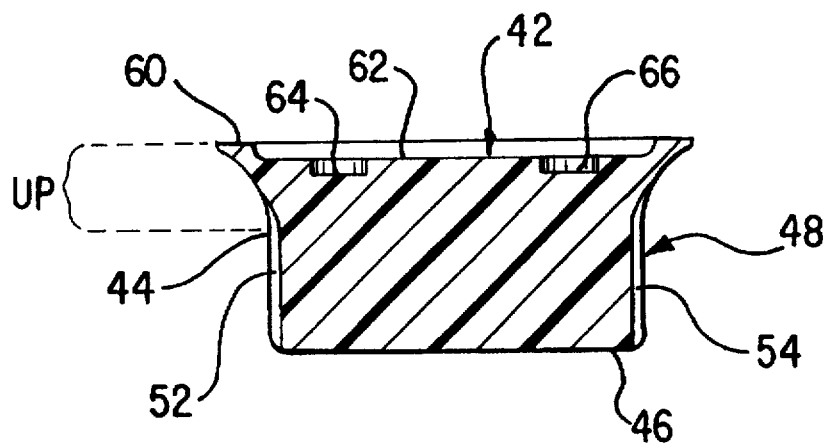
FIG. 3 is a cross-sectional view of the lid of FIG. 2 taken along line 3—3 thereof.
Figure 2:
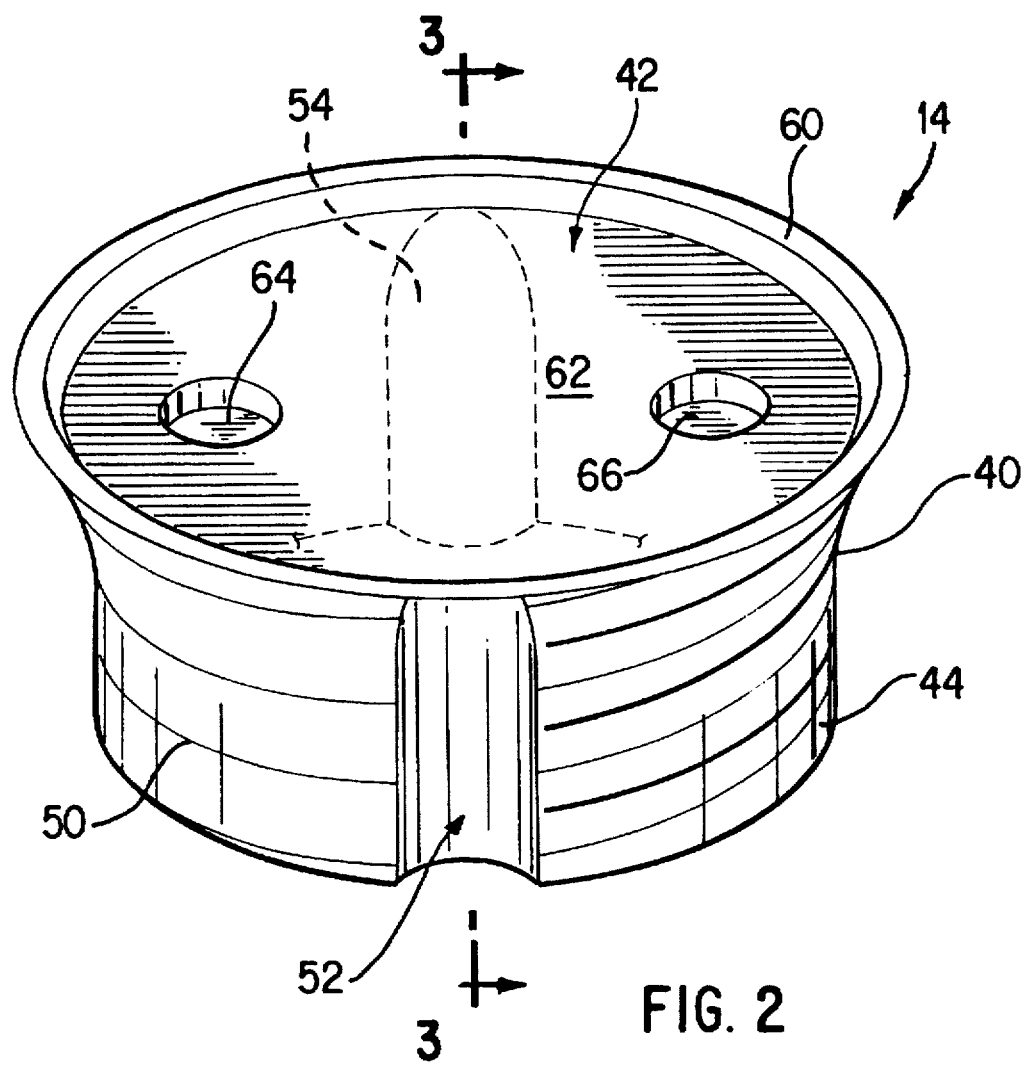
FIG. 2 is a perspective view of the lid of FIG. 1.

Referring now to FIGS. 1–3, the lid 14 has a central core 40 and a top plate 42. The top plate 42 may be provided in one piece with the core 40, although it can also be provided as a separate piece and attached to the top of the core 40 by gluing, welding, snap-fit engagement, or any other conventional connection mechanism. The core 40 and the top plate 42 can be made from the same material, or from different materials. Examples of materials that can be used for either or both of the core 40 and the top plate 42 include, but are not limited to, plastics, glass and stainless steel.

The core 40 has an annular outer wall 44 which has a curved configuration that is similar to, but not the same as, the configuration of the annular curved wall 19. Specifically, the outer wall 44 is curved from the top plate 42 to the bottom surface 46 in a manner such that the diameter of the core 40 gradually decreases from the top plate 42 to about a central portion 48 of the core 40, with the diameter of the core 40 then remaining generally the same from the central portion 48 to the bottom surface 46 of the lid 14. In addition, the diameter of the top plate 42 is larger than the diameter along any part of the core 40. A plurality of external threads 50 are provided along the circumference of the outer wall 44.

Referring more particularly to FIGS. 2 and 3, the lid 14 further includes at least one recessed groove 52 in the outer wall 44 that extends from below the top plate 42 to the bottom surface 46. The groove 52 is preferably sized to allow an optimum, but not excessive, amount of fluid to flow therethrough. As shown in FIGS. 2 and 3, a second groove 54 which is identical to the first groove 52 can also be provided in the outer wall 44 at a position substantially opposite to the first groove 52. It is also possible to position the second groove 54 at any other location along the circumference of the outer wall 44. Any number of groove can be provided, although one groove 52 is sufficient for carrying out the present invention. The external threads 50 preferably do not extend across the grooves 52 and 54.

The top plate 42 defines an annular flange 60 that extends over and covers the core 40 and the grooves 52, 54. The annular flange 60 also defines an outer circumferential edge for the top plate 42. The top surface 62 of the top plate 42 can be slightly recessed from the flange 60, as shown in FIGS. 2 and 3, or the top surface 62 can be provided generally flush with the flange 60. Referring to FIGS. 2 and 3, a pair of finger holes 64 and 66 can be provided in the top surface 62 and spaced-apart from each other. These finger holes 64 and 66 allow the user to insert two fingers into the two finger holes 64 and 66 in order to grip the lid 14 for manipulating the lid 14. As an alternative, the lid illustrated in FIG. 1 is modified to illustrate a raised ridge 68 which can be provided as a gripping bar for the same purpose of allowing the user to grip and manipulate the lid 14.

FIGS. 1, 4A, 4B, 4C, 5A, 5B and 5C illustrate how the lid 14 is used with the beverage container 12. Referring to FIG. 1, after the beverage container 12 has been filled with a hot beverage, the lid 14 is inserted through the mouth 20 of the upper section 18, and the lid 14 rotated in a first direction within the upper section 18 to cause the external threads 50 of the lid 14 to be engaged with the corresponding internal threads 30 of the upper section 18. The threaded engagement between the lid 14 and the upper section 18 secures the lid 14 inside the upper section 18. The engagement between the lid 14 and the upper section 18 can be complete (i.e., tight) or partial (i.e., loose), as explained in greater detail below.

Figure 4A:
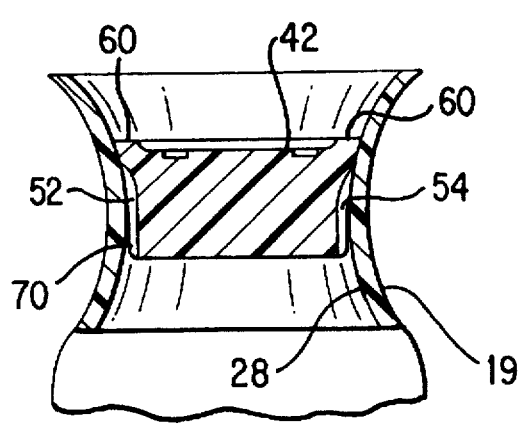
FIGS. 4A–4C are different views illustrating the beverage container and lid assembly of FIG. 1 with the lid completely secured to the beverage container.
Figure 4B:
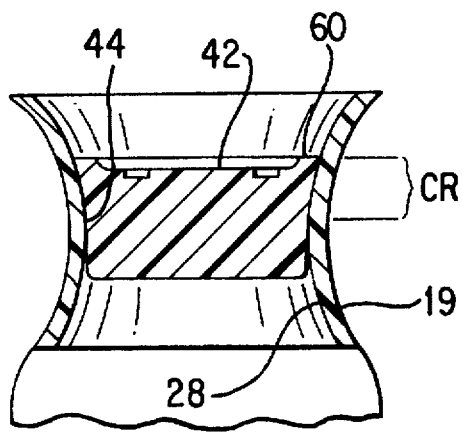
Figure 4C:
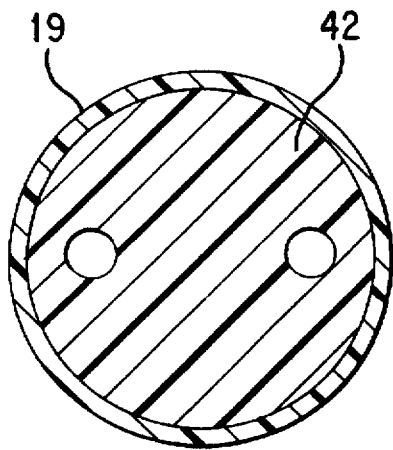

Referring now to FIGS. 4A, 4B and 4C, when the lid 14 is completely (i.e., tightly) engaged with the inner surface 28 of the curved wall 19, the top plate 42 completely covers the mouth 20 of the curved wall 19. This is best illustrated in FIG. 4C, which is a top plan view of the beverage container 12 and lid 14 assembly 10. FIG. 4B is a cross-sectional view of the beverage container 12 and lid 14 assembly 10 illustrating the outer wall 44 of the lid 14 completely (i.e., tightly) engaging the inner surface 28 of the curved wall 19 (via the engagement of the threads 30 and 50, which are not shown in FIGS. 4A and 4B to simplify the illustration). FIG. 4A is a cross-sectional view of the beverage container 12 and lid 14 assembly 10 illustrating the location of the grooves 52 and 54 with respect to the inner surface 28 of the curved wall 19, and the space 70 defined by the grooves 52, 54. In particular, FIG. 4A shows that the flange 60 completely covers the mouth 20 and the spaces 70 defined by the grooves 52, 54, and forms a complete seal for the mouth 20.

Figure 5A:
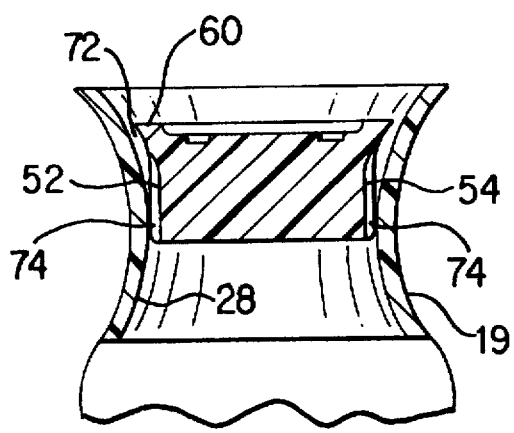
FIGS. 5A–5C are different views illustrating the beverage container and lid assembly of FIG. 1 with the lid partially secured to the beverage container in a position to facilitate the outflow of the beverage.
Figure 5B:
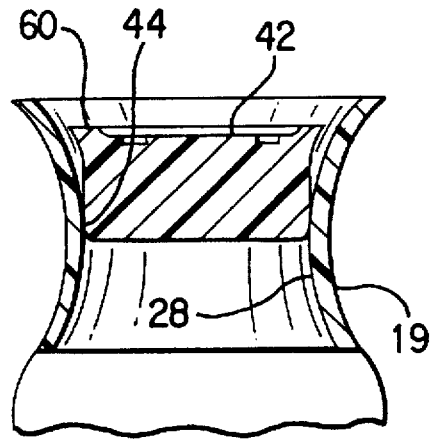
Figure 5C:
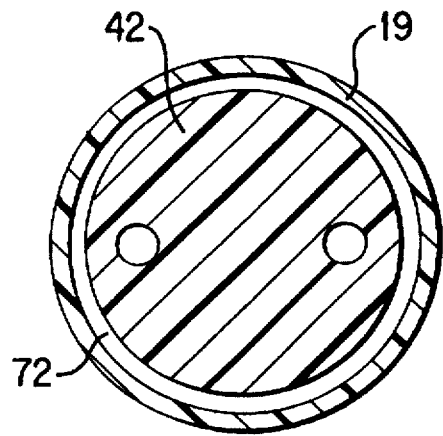

When the user now desires to drink the beverage that is stored inside the beverage container 12, the lid 14 is rotated in a second opposite direction to loosen the engagement of the lid 14 with respect to the inner surface 28 of the curved wall 19. As the lid 14 is rotated in the second direction about the threads 30 and 50, the lid 14 is raised with respect to the vertical position of the curved wall 19 (compare FIGS. 4A and 4B with FIGS. 5A and 5B). At this position of partial engagement, the lid 14 is still engaged with the inner surface 28 of the curved wall 19 since some of the lower external threads 50 on the lid 14 are still engaging some of the upper internal threads 30 on the inner surface 28. This is best illustrated in FIG. 5B, which is a cross-sectional view of the beverage container 12 and lid 14 assembly 10 illustrating a lower portion of the outer wall 44 of the lid 14 engaging the inner surface 28 of the curved wall 19 (via the engagement of the threads 30 and 50, which are not shown in FIGS. 5A and 5B to simplify the illustration). However, at this position, the engagement between the lid 14 and the inner surface 28 is somewhat looser, and not as tight, as the engagement illustrated in FIGS. 4A and 4B. By raising the lid 14 with respect to the vertical position of the curved wall 19, the top plate 42 and its flange 60 no longer completely cover the mouth 20 of the upper section 18, so that an annular gap 72 is defined between the flange 60 of the top plate 42 and the curved wall 19. The annular gap 72 is created because the outer diameter of the top plate 42 and its flange 60 is now smaller than the inner diameter of the curved wall 19 at the higher vertical position or level, since the curved nature of the upper part of the curved wall 19 means that its inner diameter gradually increases at its higher vertical levels. This is best illustrated in FIG. 5C, which is a top plan view of the beverage container 12 and lid 14 assembly 10. As a result, each groove 52 and 54 now defines a passageway 74 for the beverage to flow from inside the beverage container 12 through the lid 14 and to the external environment. This is best illustrated by FIG. 5A, which is a cross-sectional view of the beverage container 12 and lid 14 assembly 10 illustrating the location of the grooves 52 and 54 with respect to the inner surface 28 of the curved wall 19, and the passageways 74 defined by the grooves 52, 54. When the beverage container 12 and lid 14 assembly 10 is tilted, the beverage flows through one of the passageways 74, and then through the annular gap 72 into the user's mouth or another beverage container.

Thus, the grooves 52 and 54 provide a controlled passageway for fluid flow, and the curved nature of the upper part of the curved wall 19 allows beverage to flow outwardly towards the user, which together combine to effectively provide controlled flow of the beverage to prevent spillage. The curved nature of the upper part of the curved wall 19 further allows the creation of the annular gap 72, which together with the space 70 of a groove 52 or 54 forms a through passageway 74 for fluid flow. As a result, a spout is not needed and the user can drink directly from the beverage container 12. In this regard, the outer wall 44 of the lid 14 engages the inner surface 28 at all times to prevent fluid from passing through the lid 14, except at the grooves 52 and 54. The curved nature of the upper part of the curved wall 19 also guides the fluid or beverage outwardly so that the circumference of the mouth 20 provides a comfortable and convenient drinking edge.

In addition, the top plate 42 operates as a sealing mechanism that completely covers the grooves 52 and 54, so that fluid flow is interrupted when the lid 14 is completely engaged with the upper section 18, at which position the flange 60 of the top plate 42 preferably contacts the inner surface 28 of the curved wall 19 to provide a fluid-tight seal. This seal minimizes heat and fluid loss from the beverage contained therein. In this regard, the lid 14, and in particular, its top plate 42 and outer wall 44, are preferably sized and configured to be compatible with the size and configuration of the upper section 18 so as to effectuate the threaded engagements and fluid-tight seals described hereinabove. More specifically, the outer wall 44 is preferably sized and configured so that its central to upper portions (designated by "UP" in FIG. 3) are adapted to completely engage a corresponding region of the curved wall 19 (designated by "CR" in FIG. 4B) that extends from about the mid-point of the concavity (i.e., the point where the internal diameter of the curved wall 19 is smallest) of the curved wall 19 for a short distance upward toward the mouth 20.

Moreover, even though beverage container 12 has been described as being a drinking container, it is possible for the user to use it as a thermos. Thus, the user can either drink directly from the beverage container 12, or can pour the beverage contained therein into another container. The beverage container can also take the form of a mug, a glass, a cup, or any other conventional drinking container that is presently available.

Although the present invention has been described in connection with the preferred embodiments, it will be appreciated by those skilled in the art that modifications can be made and alternatives utilized without departing from the spirit and scope of the present invention.

As a non-limiting example, even though opposing threads 30 and 50 have been disclosed for engaging the outer wall 44 of the lid 14 with the inner surface 28 of the curved wall 19, these opposing threads 30 and 50 can be omitted and the core 40 of the lid 14 used to engage the inner surface 28 of the curved wall 19 in a stopper-like manner. Since the curved wall 19 and the outer wall 44 are sized and configured to correspond to each other at the region indicated by "CR" in FIG. 4B, this stopper-like engagement can be used to provide a complete or tight engagement, with the top plate 42 still acting as a fluid-tight seal. To obtain a partial engagement, the user can then lift the lid 14 slightly to reach the position shown in FIGS. 5A-5B, where the lower portion of the core 40 is still engaged (in a relatively tight engagement) with a portion of the curved wall 19.

As a further non-limiting example, the upper section 18 need not necessarily be provided in a concave configuration. The lower end 26 of the upper section 18 does not need to be flared, but can instead assume a generally straight cylindrical configuration. However, the mouth 20 of the upper section 18 is preferably flared to facilitate the controlled fluid flow and the creation of the annular gap 72.

What is claimed is:

1. An assembly, comprising:
   a. a beverage container including:
      a body defining a hollow interior for holding liquids and having a top rim;
      a curved, annular wall attached to the top rim, the curved annular wall having a central portion and an upper end that defines a drinking mouth, with the inner diameter of the curved annular wall being greater at the upper end than at the central portion; and
   b. a lid including:
      a core having an annular outer wall which has a generally curved configuration, the core further including a top end, a bottom end, and at least one groove provided along the annular outer wall and extending from the top end to the bottom end; and
      a top plate attached to the top end of the core and completely covering the groove, the top plate having an outer circumferential edge;
   wherein the top plate of the lid is positioned inside the curved annular wall and below the upper end thereof when the lid is engaged with the curved annular wall in a drinking position to allow fluid to flow from the hollow interior of the body.

2. The assembly of claim 1, wherein the lid is partially engaged with the curved annular wall of the beverage container through the engagement of a portion of the core and the curved annular wall at a position which defines:
   an annular gap between the outer circumferential edge of the top plate and the curved annular wall; and
   a fluid passageway which includes the groove and the annular gap.

3. The assembly of claim 2, wherein the lid is completely engaged with the curved annular wall of the beverage container at a position in which the top plate completely covers the mouth of the curved annular wall.

4. The assembly of claim 3, wherein the lid is positioned at a first vertical level of the curved annular wall when it is partially engaged with the curved annular wall, and wherein the lid is positioned at a second vertical level of the curved annular wall when it is completely engaged with the curved annular wall, with the first vertical level being higher than the second vertical level.

5. The assembly of claim 1, wherein the annular outer wall of the core has an upper portion, and wherein the size and configuration of the upper portion of the annular outer wall corresponds to the size and configuration of a portion of the curved annular wall to facilitate snug engagement therewith.

6. The assembly of claim 1, wherein the curved annular wall of the beverage container has an inner surface that is provided with a plurality of internal threads, and wherein the annular outer wall of the lid is provided with a plurality of external threads for engaging the internal threads of the curved annular wall.

7. The assembly of claim 1, wherein the top plate of the lid further includes an annular flange that covers the groove.

8. The assembly of claim 7, wherein the lid has a top surface, and at least two finger holes provided in spaced-apart manner on the top surface.

9. The assembly of claim 7, wherein the lid has a top surface, and a gripping bar provided on the top surface.

10. The assembly of claim 1, wherein the lid further includes a second groove provided along the annular outer wall and extending from the top end to the bottom end, and positioned substantially opposite from the one groove.

11. A method of storing a beverage inside a beverage assembly and for drinking from the beverage assembly, comprising the steps of:
   a. providing a beverage container including:
      a body defining a hollow interior and having a top rim;
      a curved annular wall attached to the top rim, the curved annular wall having a central portion and an upper end that defines a drinking mouth, with the inner diameter of the curved annular wall being greater at the upper end than at the central portion; and
   b. providing a lid including:
      a core having an annular outer wall which has a generally curved configuration, the core further including a top end, a bottom end, and at least one groove provided along the annular outer wall and extending from the top end to the bottom end; and
      a top plate attached to the top end of the core and completely covering the groove, the top plate having an outer circumferential edge;
   c. filling the hollow interior of the beverage container with a beverage;
   d. inserting the lid into the mouth of the beverage container;
   e. completely engaging the annular outer wall of the core with the curved annular wall so that the top plate completely covers the mouth;
   f. raising the lid with respect to the curved annular wall to define an annular gap between the outer circumferential edge of the top plate and the curved annular wall, with the top plate of the lid is positioned inside the curved annular wall and below the upper end thereof; and g. flowing the beverage through a fluid passageway defined by the groove and the annular gap when the top plate of the lid is positioned inside the curved annular wall and below the upper end thereof.

12. The method of claim 11, wherein step (e) further includes the step of:

(e1) providing an inner surface of the curved annular wall of the beverage container with a plurality of internal threads;

(e2) providing the annular outer wall of the lid with a plurality of external threads; and (e3) threadably engaging the internal and external threads.

13. The method of claim 12, wherein step (f) further includes the step of:

(f1) rotating the lid to partially unthread the threaded engagement of the internal and external threads.

* * * * *